United States Patent [19]
Cowles

[11] Patent Number: 4,603,407
[45] Date of Patent: Jul. 29, 1986

[54] ROTATIONAL GEOPHONE

[75] Inventor: Christopher S. Cowles, Houston, Tex.

[73] Assignee: Shell Oil Company, Houston, Tex.

[21] Appl. No.: 556,202

[22] Filed: Nov. 29, 1983

Related U.S. Application Data

[62] Division of Ser. No. 324,229, Nov. 13, 1981.

[51] Int. Cl.⁴ ............................................. G01V 1/18
[52] U.S. Cl. ........................................ 367/75; 367/185
[58] Field of Search ................ 181/104, 122; 367/75, 367/140, 149, 178, 185, 186, 912, 182, 183, 184; 73/517 A; 310/322, 329

[56] References Cited

U.S. PATENT DOCUMENTS

| | | | |
|---|---|---|---|
| 2,390,187 | 12/1945 | Sharpe | 73/517 A |
| 2,637,839 | 5/1953 | Piety | 367/185 |
| 2,927,300 | 3/1960 | Smith | 367/75 |
| 2,942,457 | 6/1960 | Sink | 367/182 |

Primary Examiner—Salvatore Cangialosi
Assistant Examiner—Ian J. Lobo

[57] ABSTRACT

A rotational geophone is provided. This rotational geophone employs a coil mounted on a torsional wire in a static magnetic field to detect movement of the frame relative to the coil. This rotational geophone may also be combined with a velocity geophone to obtain seismic data representing shear waves traveling in a particular direction.

4 Claims, 6 Drawing Figures

ROTATIONAL GEOPHONE

This is a division of application Ser. No. 324,229, filed Nov. 23, 1981.

RELATED PATENTS

The present application is related to U.S. Pat. No. 4,134,095 entitled "Combination Geophone/Hydrophone" issued on Jan. 9, 1979, to the same inventor as the present application.

BACKGROUND OF THE INVENTION

The present invention relates to seismic exploration and more particularly to a method and apparatus for preferentially detecting seismic shear waves having a given direction of propagation. In the above referenced patent, there is descirbed an apparatus and method for preferentially detecting seismic compressional waves having a given direction of travel. The term "direction of travel" is used to describe whether the seismic wave propagating upwardly or downwardly through the earth. As explained in the patent, the preferential detection of a seismic wave is important in correcting the seismic data for various errors and removing unwanted or noise signals from the seismic data.

Recently, there has been renewed interest in utilizing shear waves for obtaining seismic data. The use of shear waves for obtaining seismic data in contrast to the use of compressional waves permits one to obtain information regarding some subsurface formations that is impossible to obtain from compressional waves. While means are known for preferentially detecting compressional waves, no methods or apparatus have been devised as yet for preferentially detecting shear waves traveling in a given direction. Preferential detection of shear waves is necessary in order to remove unwanted noise from seismic data, particularly when the detector is placed below the surface of the earth.

Compressional (dilatational) waves are defined as waves in which the direction of particle displacement is a medium is normal to the wave front while shear (rotational) waves are defined as waves in which the direction of particle displacement in a medium is parallel to the wave front. While a conventional velocity geophone can be disposed to detect shear waves, it will not discriminate waves based on their direction of travel. Likewise the method dislcosed in the above referenced patent cannot be used to preferentially detect shear waves. The patent discloses the use of a velocity geophone and hydrophone in combination to preferentially detect compressional waves having a given direction of travel. The hydrophone responds to the pressure fluctuation produced by the particle movement while the geophone responds to the particle movement. In the case where the hydrophone signal remains the same for both up-travelling waves and down-travelling waves, for example, the geophone signal reverses polarity as the direction of travel of the waves reverses. It is then possible to preferentially detect up- or down-travelling waves by adding or subtracting the two signals. This method cannot be used to preferentially detect shear waves since no dilatation (pressure fluctuation) is associated with the shear wave. Thus, if the geophone and hydrophone were properly disposed, the method would detect the particle motion associated with the shear wave, parallel to the wave front, but not discriminate the direction of travel of the wave front.

BRIEF DESCRIPTION OF THE INVENTION

The present invention provides an apparatus and method for preferentially detecting the wave motion associated with seismic shear waves. In particular, the invention provides a method by which one can detect the wave motion for a wave travelling in an upwardly or downwardly direction. The method comprises disposing a velocity responsive geophone and a rotational geophone below the surface of the earth. The velocity geophone is disposed with its sensitive axis perpendicular to the axis of rotation of the rotational geophone and parallel to the wave front. The rotational geophone is disposed so that it will respond to the rotational couple of a shear wave with its axis parallel to the wavefront. Since the particle motion in a shear wave travelling in a direction roughly normal to the surface of the earth is in a plane parallel to the surface of the earth, the rotational geophone will respond to the rotational couple to the shear wave while the velocity geophone will respond to the particle movement of the shear wave.

The rotational geophone signal is first integrated and its amplitude scaled so that it will correspond to the amplitude of the signal from the velocity geophone. The two signals are then added and subtracted to provide the sum and difference signal. As is explained below, if the wave front was travelling in an upwardly direction the sum of the signals is a signal having roughly double the amplitude of the individual signals while the difference is a signal having zero amplitude.

The rotational geophone is similar in construction to a D'Arsonval galvanometer. The geophone uses a coil suspended in a magnetic field which rotates in response to the rotational couple of the shear wave. In contrast, the galvanometer has a coil of low inertia which rotates in a magnetic field in response to a current applied to the coil. Thus, the geophone coil must have high inertia while the galvanometer coil must have low inertia.

BREIF DESCRIPTION OF THE DRAWINGS

The invention will be more easily understood from the following detailed description of a preferred embodiment in which.

DESCRIPTION OF A PREFERRED EMBODIMENT

Figure 1:
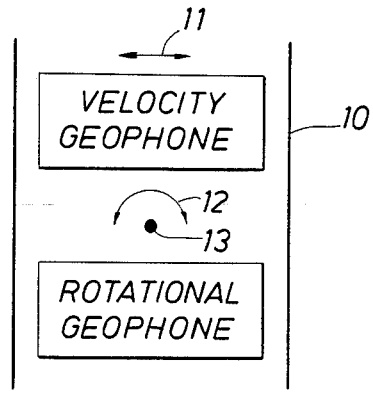
FIG. 1 is a block diagram showing the disposition of the geophones in a borehole.

Referring now to FIG. 1, there is shown a velocity geophone and a rotational geophone disposed in a borehole 10. As explained in the above patent, the borehole must be filled so that both geophones will respond to motion in the earth caused by the seismic disturbance. In particular, the velocity geophone is disposed with its sensitive axis aligned as shown by the vector 11 while the rotational geophone is disposed with its rotational axis 13 at right angles to the vector 11. Thus, shear waves travelling upwardly and downwardly in the earth penetrated by the borehole having particle motions from left to right or right to left, will cause both the velocity geophone and the rotational geophone to respond.

Figure 2:
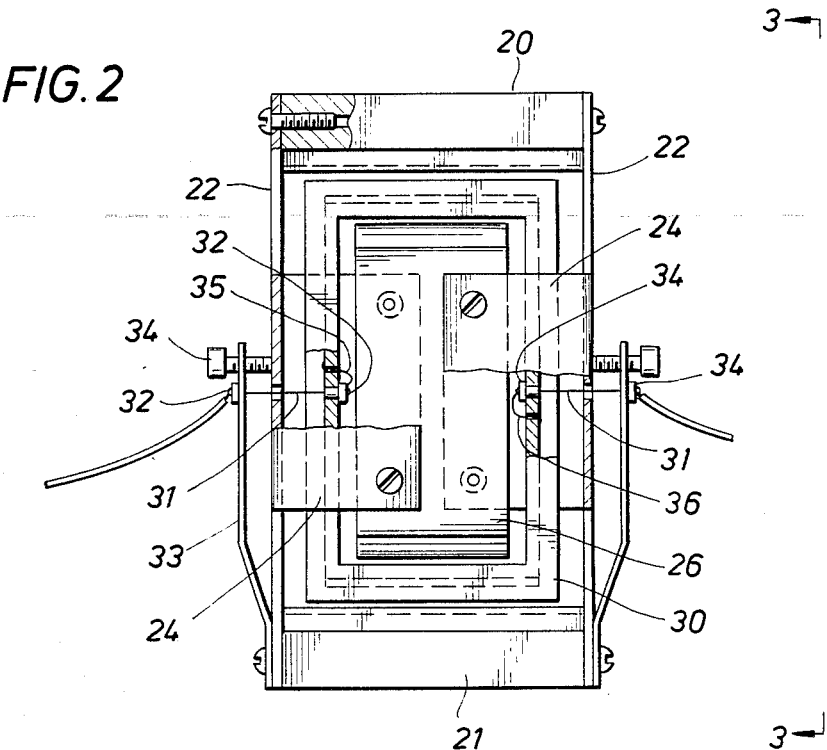
FIG. 2 is an end view of the rotational geophone with portions removed for clarity.
Figure 3:
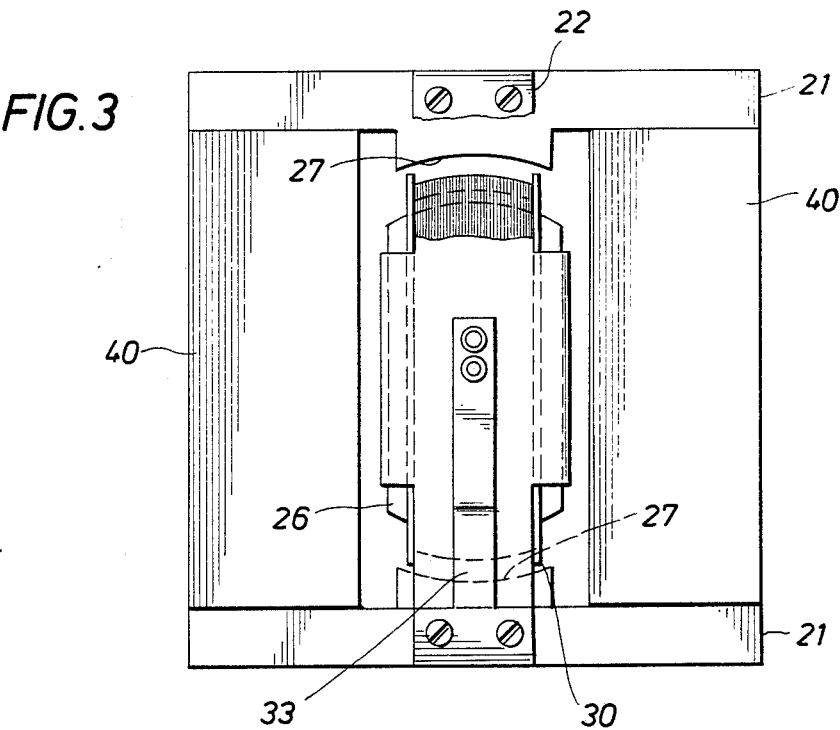
FIG. 3 is a side view of the rotational geophone with portions removed for clarity.

Referring now to FIGS. 2 and 3, there is shown the detailed construction of a rotational geophone that can be used with this invention. No construction is shown for the velocity geophone since this is a commercially available item well known to those skilled in the art. As shown, the rotational geophone consists of outer pole pieces 20 and 21 which are held in position by mounting brackets 22 at each side. The permanent magnets 40 shown in FIG. 3 are omitted from the end view shown in FIG. 2. The mounting brackets have inwardly extending flanges 24 which are used to support the inner pole piece 26. Thus, there is a magnetic field established between the ends 27 of the pole pieces as shown in FIG. 3 and the inner pole piece 26. Suspended between the outer and inner pole pieces is a coil 30 which is formed on a suitable coil form and consists of a number of turns of relatively fine wire, for example, 250 turns of AWG number 40 wire. The coil form is suspended by means of short lengths of fine wire 31 with ends of the wire being provided with suitable pieces 32 so that they may be tensioned to support the coil within the magnetic field. The fine wires 31 are mounted in insulating bushings 34. The ends 35 and 36 of the coil 30 are secured to the inner ends of the wires 31 while the output leads are secured to the outer ends of the wires 31. In particular, the tension is supplied by tension arms 33 which are fastened to the lower outer pole piece 21 and provided with an adjusting means such as a screw 34 at the top. Thus, the small supporting wires may be tensioned to accurately align and support the coil within the magnetic field. As explained above, the coil remains relatively stationary while the magnets move in response to the rotational couple of the shear waves.

While no mounting means are shown for the two geophones, they can be placed in a single housing that is adapted for lowering in the borehole. When mounting the geophones in a housing steps must be taken to ensure proper alignment of their axes and that the geophones' response to motion in the earth and are not insulated therefrom. It is also possible to dispose the geophones individually in the borehole providing the proper orientation of their sensitive axes is maintained.

The geophone signals can be recorded with conventional seismic recording systems, preferably a digital recording system. The recording of the signals in digital form allows subsequent processing using digital computers and seismic techniques. As explained above, the rotational geophone signal must be integrated and then scaled before it can be combined with the velocity geophone signal.

Figure 4:
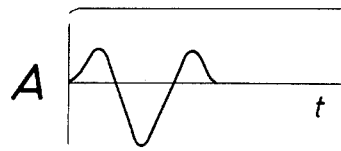
FIG. 4 illustrates the wave forms of the signals produced in the velocity and rotational geophones in response to particular shear waves.
Figure 4:
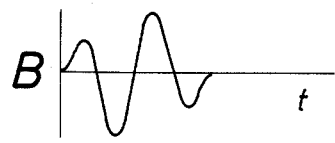
Figure 4:
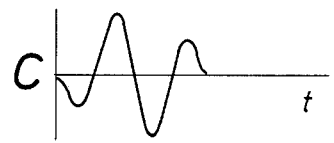
Figure 4:
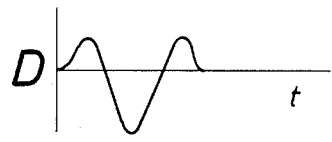
Figure 4:
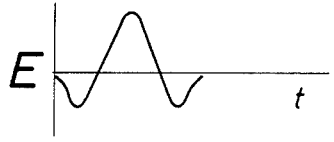

When the combination of the velocity and rotational geophones is disposed in a borehole as shown in FIG. 1, it will respond to a shear wave travelling either upwardly or downwardly in the earth. In particular, as shown in FIG. 4, if one assumes that the wave is travelling up and that the particle motion is first to the right and that particle motion to the right will produce a positive voltage in the velocity geophone and that counterclockwise rotation of the body of the rotational geophone will cause the rotational geophone to provide a positive voltage, one may obtain from the velocity and rotational geophones the wave forms shown in Figures A and B of FIG. 4, respectively. When the wave travels in a down direction, the signal from the velocity geophone will remain the same since it will first see particle motion to the right. In contrast, the rotational geophone will sense clockwise rotation since particle motion to the right will first strike the upper part of the geophone to be followed by particle motion to the left, producing the signal shown as wave form C of FIG. 4. Taking the time integrals of the waveforms B and C of FIG. 4, one obtains the waveforms D and E respectively in FIG. 4.

Figure 5:
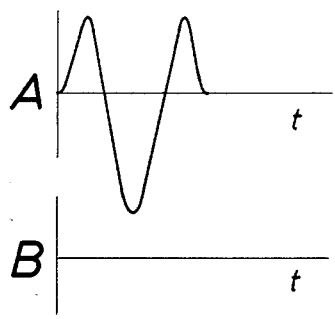
FIG. 5 illustrates the wave forms resulting from adding and subtracting geophone signals produced by upwardly travelling waves.
Figure 6:
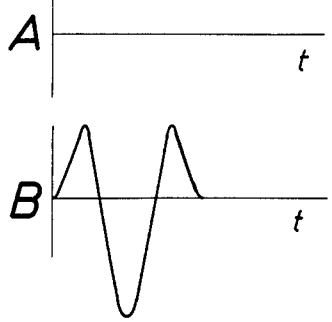
FIG. 6 illustrates the wave forms resulting from adding and subtracting geophone signals produced by downwardly travelling waves.

If one takes the sum and the difference of the waveforms shown in A and D of FIG. 4, produced by an upwardly-travelling shear wave, one will obtain the waveforms shown in A and B of FIG. 5. If one takes the sum and difference of the signals shown in waveforms A and E of FIG. 4, corresponding to a downwardly-travelling shear wave, one obtains the signals shown in FIGS. 6A and B respectively. From this comparison, it is seen that if the sum of the velocity geophone signal and rotational geophone integrated signal is a signal of twice the magnitude and the difference is a zero amplitude signal, the shear wave was upwardly-travelling. In contrast, if the sum is of zero amplitude while the difference is a signal of twice the amplitude, the shear wave was downwardly-travelling.

If one assumes the same conditions described for FIG. 4 but that the particle motion was first to the left and then to the right, one would obtain the exact reverse of the signals shown in the waveforms A, B, C, D and E of FIG. 4. For example, a movement to the left would produce a negative signal from the velocity geophone which would be followed by movement to the right producing a positive signal. Thus, the waveform of Figure A would be inverted and one can also show that the waveforms shown in B and D of FIG. 4 would also be inverted. If these signals are added and subtracted, one will again obtain the negatives of the signals as shown in FIG. 5 for upwardly-travelling waves and in FIG. 6 for downwardly-travelling waves.

Clearly, from the above description, the use of velocity and rotational geophones whose sensitive axes are disposed as shown in FIG. 1, permits the preferential detection of shear waves within the earth. Of course, as explained, integration of the signal from the rotational geophone is necessary since this is a rotational rate signal, i.e., the time derivative of the particle velocity gradient, while the geophone supplies a particle velocity signal. Also the amplitudes of the signals must be scaled prior to the addition and subtraction of the two signals. All of these functions can be readily performed by electrical circuits, for example by using operational amplifiers, or computationally by a simple computer.

What is claimed is:

1. A combination velocity and rotational geophone apparatus for obtaining data for seismic records representing the direction of propagation of shear waves in a seismic wave, said apparatus comprising:
   a velocity geophone; and
   a rotational geophone, said rotational geophone being disposed in relation to said velocity geophone to respond to the rate of rotational waves in a plane including the sensitive axis of the velocity geophone.

2. The apparatus of claim 1 wherein said rotational geophone comprises a frame member supporting a magnet having a pair of opposed arcuate shaped pole pieces; a coil of conducting wire disposed between said pole pieces, said pole pieces and coil rotating relative to each other.

3. The apparatus of claim 2 wherein the axis of rotation of said coil is at right angles to the sensitive axis of the velocity geophone.

4. A rotational geophone for measuring the rotational coupled of a shear wave comprising:
 a frame member;
 a magnet having a pair of outer opposed pole pieces and an inner pole piece spaced from and alignedly disposed between said outer pole pieces, said magnet being mounted in said frame member; and
 a rotatable, coil of conducting wire disposed between said inner pole piece and said outer pole pieces, said coil has sufficient mass to remain stationary with respect to said magnet.

* * * * *